US009628421B2

(12) United States Patent
Vuong (10) Patent No.: US 9,628,421 B2
(45) Date of Patent: *Apr. 18, 2017

(54) SYSTEM AND METHOD FOR BREAKING UP A MESSAGE THREAD WHEN REPLYING OR FORWARDING A MESSAGE (71) Applicant: BlackBerry Limited, Waterloo (CA)

(72) Inventor: Thanh Vinh Vuong, Waterloo (CA)

(73) Assignee: BlackBerry Limited, Waterloo (CA)

( * ) Notice: Subject to any disclaimer, the term of this patent is extended or adjusted under 35 U.S.C. 154(b) by 313 days.

This patent is subject to a terminal disclaimer.

(21) Appl. No.: 13/912,677

(22) Filed: Jun. 7, 2013

(65) Prior Publication Data

US 2013/0275882 A1 Oct. 17, 2013

Related U.S. Application Data (63) Continuation of application No. 13/118,639, filed on May 31, 2011, now Pat. No. 8,484,302.

(30) Foreign Application Priority Data

Sep. 24, 2010 (EP) ..................... 10179667

(51) Int. Cl.
*H04L 12/58* (2006.01)
*G06Q 10/10* (2012.01)

(52) U.S. Cl.
CPC ........... *H04L 51/16* (2013.01); *G06Q 10/107* (2013.01); *H04L 12/586* (2013.01); *H04L 51/14* (2013.01);
(Continued)

(58) Field of Classification Search
CPC ......... H04L 12/58; H04L 51/14; H04L 51/28; H04L 51/22; G06Q 10/107; G06F 17/2705
See application file for complete search history.

(56) References Cited

U.S. PATENT DOCUMENTS 7,657,839 B2 2/2010 Moody et al.
7,720,919 B2 5/2010 Khouri et al.
(Continued)

FOREIGN PATENT DOCUMENTS

WO 20090147295 A1 12/2009

OTHER PUBLICATIONS

European Examination Report dated Sep. 6, 2013, issued by the European Patent Office for corresponding European Patent Application No. 10 179 667.0.
(Continued)

Primary Examiner — Chirag R Patel
(74) Attorney, Agent, or Firm — Moffat & Co.

(57) ABSTRACT

Disclosed is a method of communicating a message thread, comprising: receiving a message thread at a first device, the message thread comprising existing sub-messages; receiving input of a newly composed sub-message associated with the message thread; delineating each of the respective existing sub-messages from one another within the message thread; receiving selection of at least one delineated existing sub-message from the message thread through a selection interface for one of inclusion in and exclusion from a modified message thread; creating a modified message thread in accordance with the selection of at least one delineated existing sub-message, the modified message thread further comprising the new sub-message; and initiating communication of the modified message thread to a second device.

17 Claims, 7 Drawing Sheets (52) U.S. Cl.
CPC .............. *H04L 51/22* (2013.01); *H04L 51/28* (2013.01); *H04L 12/585* (2013.01)

(56) References Cited

U.S. PATENT DOCUMENTS

| | | | |
|---|---|---|---|
| 8,484,746 B2 * | 7/2013 | Bhide et al. | 726/28 |
| 8,510,664 B2 * | 8/2013 | Rueben | G06Q 10/00 709/206 |
| 2003/0167310 A1 | 9/2003 | Moody et al. | |
| 2004/0260710 A1 | 12/2004 | Marston et al. | |
| 2005/0198143 A1 | 9/2005 | Moody et al. | |
| 2006/0277260 A1 * | 12/2006 | Hardy | H04L 51/28 709/206 |
| 2007/0005715 A1 | 1/2007 | LeVasseur et al. | |
| 2008/0222257 A1 | 9/2008 | Mukherjee et al. | |
| 2009/0132664 A1 | 5/2009 | Radenkovic et al. | |
| 2009/0287780 A1 | 11/2009 | Gawor et al. | |
| 2010/0070592 A1 | 3/2010 | Steuer et al. | |
| 2010/0076989 A1 | 3/2010 | Jakobson | |
| 2010/0088377 A1 | 4/2010 | Johnson et al. | |

OTHER PUBLICATIONS

Tschabitscher, Heinz; "How to Print an Individual Email Message in Gmail", http://email.about.com/od/gmailtips/qt/How_to_Print_an_individual_Email_Message_in_Gmail.htm; About.com Guide, Jul. 30, 2004.

Extended European Search Report issued by the European Patent Office dated Mar. 14, 2011 for corresponding European Patent Application No. 10179667.0.

Canadian Official Action dated Jun. 5, 2013, issued by the Canadian Intellectual Property Office for corresponding Canadian Patent Application No. 2,749,813.

* cited by examiner

Figure 7

SYSTEM AND METHOD FOR BREAKING UP A MESSAGE THREAD WHEN REPLYING OR FORWARDING A MESSAGE

FIELD

The present matter relates to communication devices, and more particularly to a method of replying to or forwarding a message.

BACKGROUND

Electronic data communications are prevalent in many scenarios, including work, friends and family. Often an exchange of messages between two or more parties defines a message thread. A thread of previous messages may grow to be large, particularly when there are many parties to the exchange.

Email communications often comprise a thread of previous email messages. People commonly forward and reply to these email message threads. Users may not want to include all messages contained in the email message thread when replying to or forwarding email messages to certain recipients. For example, email message threads can contain information that is sensitive or confidential. Further, certain, email threads destined to corporations should not be forwarded outside the company.

BRIEF DESCRIPTION OF THE DRAWINGS

In order that the subject matter may be readily understood, embodiments are illustrated by way of examples in the accompanying drawings, in which.

DETAILED DESCRIPTION

According to an aspect of the present application, disclosed is a method of communicating a message thread, comprising: receiving a message thread at a first device, the message thread comprising existing sub-messages; receiving input of a newly composed sub-message associated with message thread; delineating each of the respective existing sub-messages from one another within the message thread; receiving a selection of at least one delineated existing sub-message from the message thread through a selection interface for one of inclusion in and exclusion from a modified message thread; creating a modified message thread in accordance with the selection of at least one delineated existing sub-message, the modified message thread further comprising the new sub-message; and initiate communication of the modified message thread to a second device.

According to another aspect of the present application, disclosed is a communication device comprising a processor and memory coupled thereto and a communication subsystem, coupled to the processor for communicating over a network, the memory storing instructions and data for execution by the processor to configure the device to: receive a message thread at a first device, the message thread comprising existing sub-messages; receive input of a newly composed sub-message associated with the message thread; delineate each of the respective existing sub-messages from one another within the message thread; receive a selection of at least one delineated existing sub-message from the message thread through a selection interface for one of inclusion in and exclusion from a modified message thread; create a modified message thread in accordance with the selection of at least one delineated existing sub-message, the modified message thread further comprising a newly composed sub-message; and initiate communication of the modified message thread to a second device.

According to another aspect of the present invention, disclosed is a computer readable medium comprising a memory having computer readable code embodied therein, for execution by a processor for configuring a communication device to communicate message threads over a network, the computer program product comprising instructions and data for configuring a processor of the mobile device to: receive a message thread at a first device, the message thread comprising existing sub-messages; receive input of a newly composed sub-message associated with the message thread; delineate each of the respective existing sub-messages from one another within the message thread; receive a selection of at least one delineated existing sub-message from the message thread through a selection interface for one of inclusion in and exclusion from a modified message thread; create a modified message thread in accordance with the selection of at least one delineated existing sub-message, the modified message thread further comprising a newly composed sub-message; and initiate communication of the modified message thread to a second device.

Figure 1:
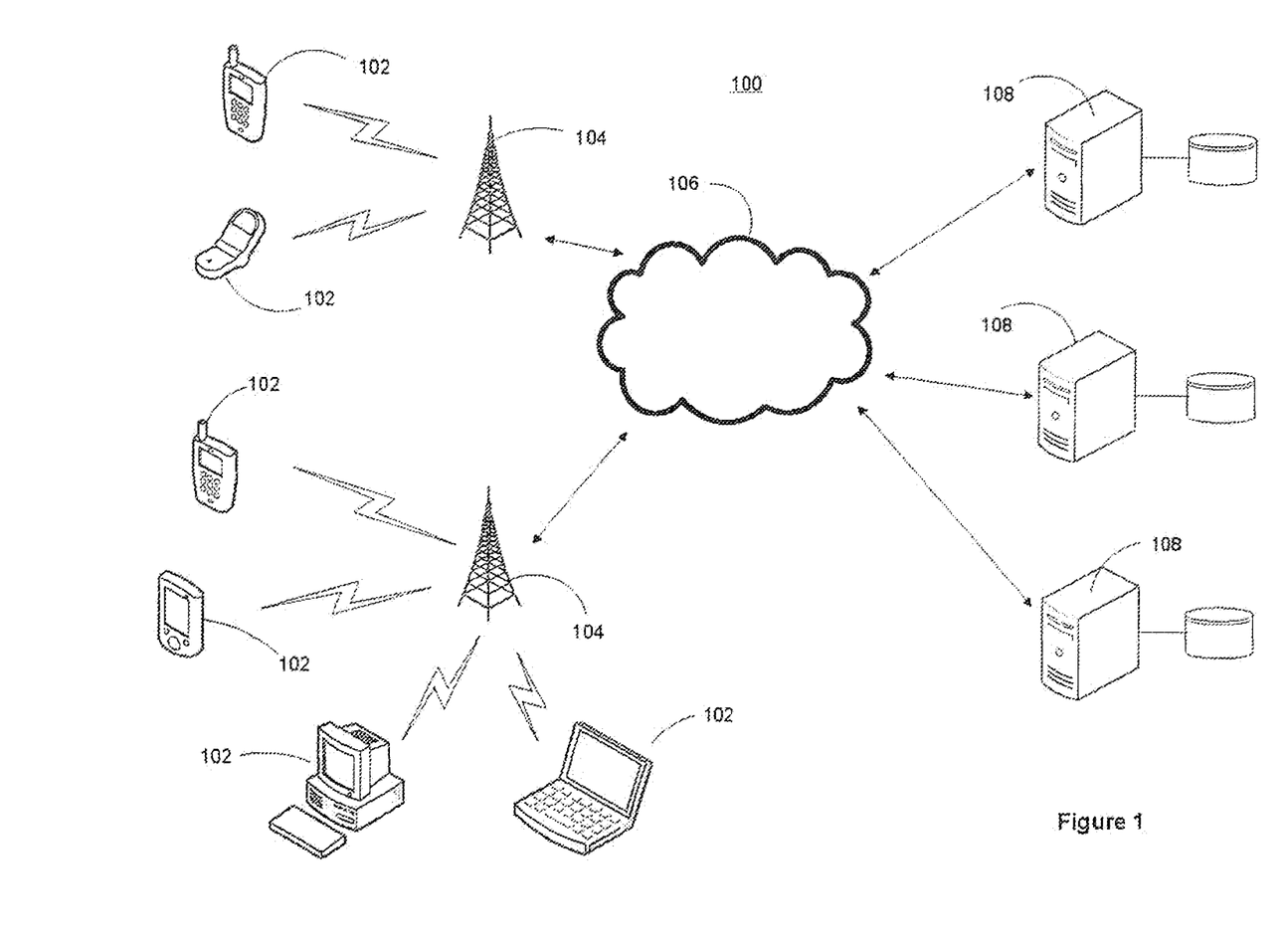
FIG. 1 is a block diagram illustrating a telecommunication infrastructure.

For convenience, like numerals in the description refer to like structures in the drawings. Referring to FIG. 1, a typical telecommunication infrastructure is illustrated generally by numeral 100. The telecommunication infrastructure 100 includes a plurality of devices 102, a plurality of base stations 104, a communication network 106 and a plurality of network servers 108. The devices 102 can, for example, be mobile device, laptops or personal computers.

The mobile devices 102 include wireless computing devices such as a smart phone, a personal digital assistant (PDA), and the like. The mobile devices 102 are in communication with one of the base stations 104. The base stations relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 may comprise a Web servers, application servers, or application servers with web services. It will be appreciated by a person of ordinary skill in the art that the telecommunication infrastructure 100 described herein is exemplary and that changes may be made to one or more components to accommodate different network configurations without affecting the scope of the aspects described herein.

The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a smart phone, a wireless Internet appliance, or a data communication device.

Figure 2:
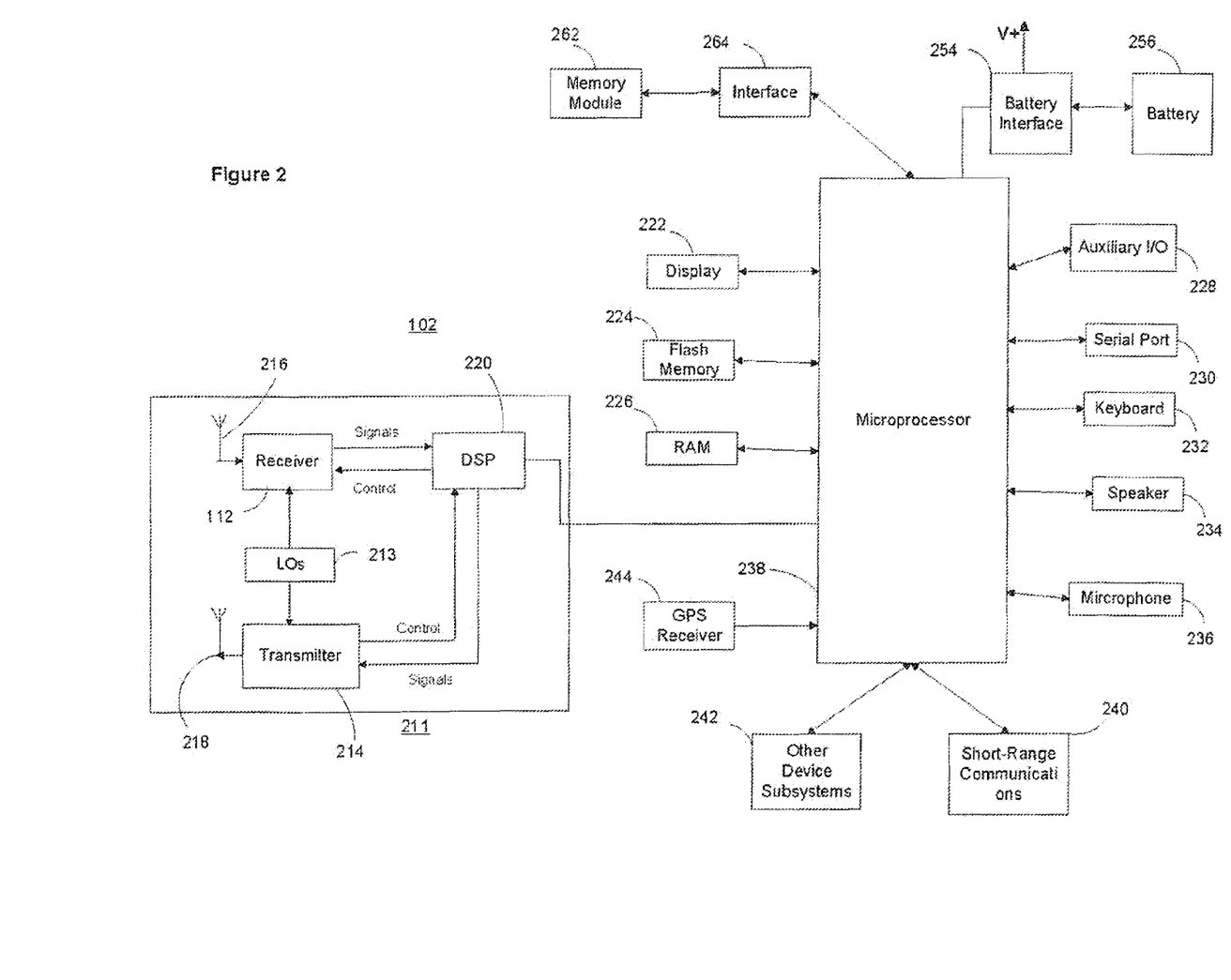
FIG. 2, is a block diagram illustrating components of a mobile device.

Referring to FIG. 2, a mobile device 102 in accordance with one embodiment is illustrated in greater detail. The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate. The device 102 may be configured for communication using more than one network (e.g. cellar or Wi-Fi networks) and may comprise more than one antenna elements, receivers, transmitters or other associated components.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 may also include a positioning device 244, such as a GPS receiver, for receiving positioning information.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, trackball, light pen or touch sensitive screen.

Location-based applications executing on the mobile device 102 use positioning information from the positioning device 244 to provide relevant information to the user, often in real-time. The positioning device 244 may be a GPS receiver for receiving satellite broadcasts. In one embodiment, the satellite broadcast data is used by the mobile device 102 to determine its position. In another embodiment, the satellite broadcast data is transmitted from the mobile device 102 to one of the network servers 108 to determine the position of the mobile device 102.

Alternatively, the positioning device 244 may be a positioning module for receiving positioning information from one of the network servers 108. In this embodiment, the positioning module may comprise a software, rather than a hardware, solution.

Messaging applications, such as email and instant messaging, are included on the mobile device 102. A personal information manager (PIM) is operating on the mobile device 102. The PIM includes the archives of messages such as email messages and instant messages.

Messaging

Devices 102 can communicate with each other over the network 106 using email or other types of messaging applications (e.g. instant messaging). More particularly, a first device communicates an initial message to a second device 102. The second device 102 receives the initial message and can then send a reply message back to the first device. The reply message is a message thread that comprises the initial message together with a response from the user of the second device 102. The second device may reply to the initial message or forward the initial message to a third device. A person of ordinary skill in the art will appreciate that other actions may be performed (e.g. save, delete) that are not relevant to the present description. When the initial message is forwarded to the third device, the forwarded message is a message thread that includes the initial message as well as any additional information (e.g. text or links) included by the user of the second device. There can then be further replies on behalf of the first, second or third device to other devices. The devices 102 can, for example, be mobile devices or personal computers.

In an embodiment, the message is an email message. Email messages are communicated between devices 102 over a network 106 using the Post Office Protocol (POP), Internet Message Access Protocol (IMAP) or Simple Mail Transfer Protocol (SMTP), for example. The email applications on each device 102 that implement the email message protocol generally have an inbox interlace that displays all received messages. For example, the inbox interface typically displays the sender's identification, the subject or title of the message and the date when the message was received. The inbox interface allows a user to select a received message in order to view its contents, to reply to it or to forward it to other email addresses. When a message is selected from the inbox interface, an email message interface is opened in a new window. Protocols, methods and systems for email messaging will be familiar to a skilled person.

Figure 3:
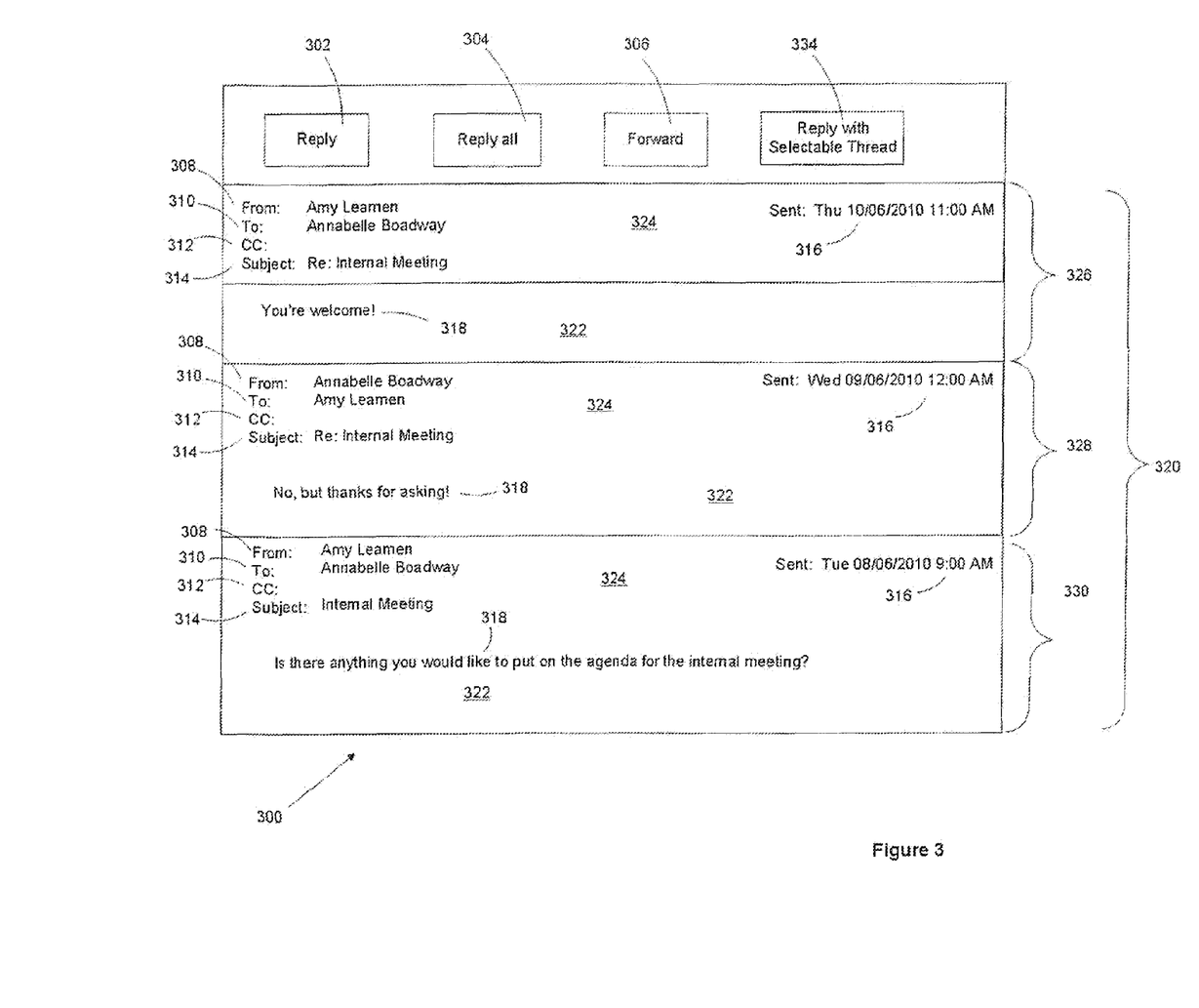
FIG. 3 is a schematic diagram showing an email message interface.

FIG. 3 shows a schematic diagram of an email message interface 300. The interface 300 consists of an email message thread 320 including a first message 330, a second message 328 and a third message 326. Each of the three messages 330, 328, 326 may also be referred to as a sub-message or an existing sub-message. Each message has a message body 322 and a message header 324. The message body 322 comprises message text 318. Further, the message body 322 can comprise a link (not shown) to, for example, a webpage, or other data such as an image. The message header 324 has a number of information fields including a "from" field 308 a "to" field 310, a "cc" field 312, a "subject" field 314 and a "sent" field 316 as is familiar to a person of ordinary skill in the art. Each field 308, 310, 312, 314, 316 can be filed in or populated with data or information.

There are four buttons 302, 304, 306, 334 along the top of the interface 300. Each of the four buttons 302, 304, 306, 334 is associated with a specific function. Thus, when a button 302, 304, 306, 334 is selected or actuated, the associated function is initiated. The buttons 302, 304, 306, 334 can be virtual buttons on the screen of a device. For example, the buttons may be activated by touch (e.g. on a touch-screen display) or by directing a cursor onto the button and then pressing a key. It is recognized that the buttons 302, 304, 306, 334 are only one example of how the associated functions may be initiated. By way of alternative examples, each of the associated functions can be initiated using touch-screen gestures, voice commands, or other ways of inputting data into a device.

The buttons 302, 304, 306, 334 are each associated with a specific function as follows. The "reply" button 302 is used to reply to the message sender and optionally to third parties. The "reply all." button 304 is used to reply to all persons listed in the "from" field 308, "to" field 310 and "cc" field 312 and to any additional third parties selected by the user. The "forward" button 306 is used to forward the message thread 320 to another recipient and to any additional third parties selected by the user. A forwarded message typically includes any attachments associated with the received message thread 320. The "reply with selectable thread" button 334 is for providing the user with the option of selecting which messages (or sub-message) from the received message thread 320 to include in reply message thread. In the present embodiment, when any of the buttons 302, 304, 306, 334 are selected, a new window opens up providing a new message interface to allow a user to enter the text of a new email message and to allow the user to alter the information in the fields 308, 310, 312 for the new email message.

Figure 4:
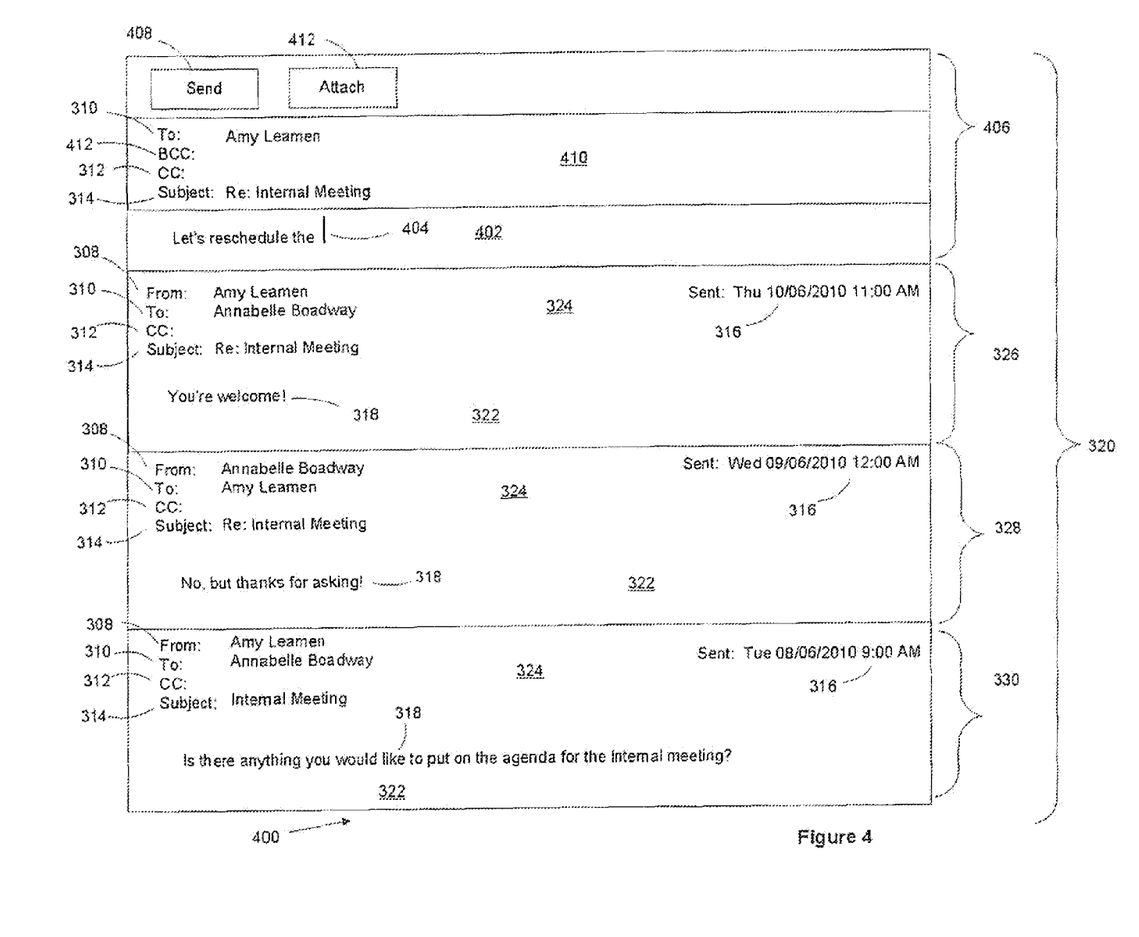
FIG. 4 is a schematic diagram showing reply message interface.

FIG. 4 shows a schematic diagram of an example of a reply message interface 400. The reply message interface 400 appears in a new window on the display of the device 102 when a user selects the "reply" button 302. The reply message interface 400 allows a user to enter a new message 406. The reply message interface 400 includes a message body 402 section where a user can enter data or input text (as indicated by the curser 404). Data can include links, .jpg files or other types of data familiar to a skilled person. Additionally, files can be attached to email messages using the "attach" button 412. A send button 408 is located in the top portion of the interface 400. When the send button 408 is selected, the message thread 320 including the new message body 402 is communicated through the network 106 to each desired recipient (as indicated in the "to" field 310, the "cc" field 312 and the "bcc" field 412).

Generally, one or more of the messages 326, 328, 330 can be manually deleted or modified by a user in the new message interface 400 before the send button 408 is selected. For example, the entire first message 330 can be deleted from the message thread 320 (using a "cut" operation for example) before the send button 408 is selected and hence before the message thread 320 is communicated over a network 106.

Selectable Messages

Figure 5:
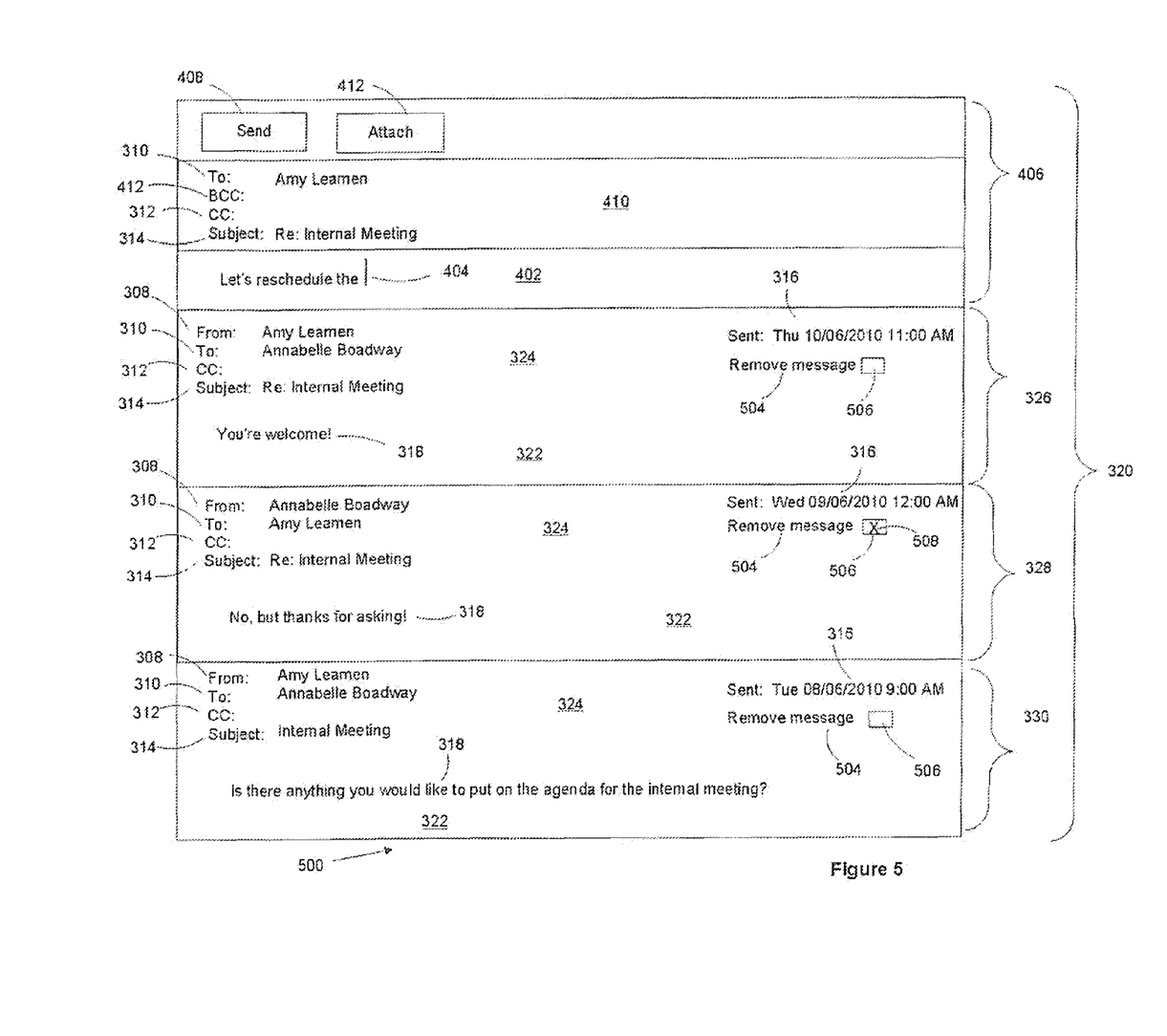
FIG. 5 is a schematic diagram showing a selectable message interface.

FIG. 5 shows a schematic diagram of a selectable message interface 500. The selectable message interface 500 appears when the "reply with selectable thread" button 334 is selected. The selectable message interface 500 is used to select specific existing sub-messages 326, 328, 330 to include in a modified message thread. The selectable message interface 500 appears in a new window on the display of the device 102. Interface 500 includes the text and data of each of the existing sub-messages 326, 328, 330 in the message thread 320.

The email application can include a parsing function to delineate each of the existing sub-messages 326, 330. For example, the parsing function parses the text of the message thread 320 to determine where the header 324 of each sub-message 326, 330 is located. More particularly, when the message thread 320 is parsed the beginnings of each sub-message 326, 330 is determined by locating header 324 text that is at the beginning of each sub-message 326, 330 (e.g. the fields 308, 310, 312, 314).

Alternatively, or additionally, message threads 320 can be encoded using a markup language or structured definition language (e.g. XML). More particularly, each sub-message 326, 330 may be encoded using tags (e.g. <email> and </email>) or attributes of tags (e.g. <div class="message">) so that the text (header 324 and body 322) of each sub-message 326, 330 is in between the tags. An email application uses this tag information to locate the starting and ending tags of each sub message 326, 330 thereby locating the beginning and ending of each sub-message 326, 330.

Each sub-message 326, 328, 330 includes a remove message field 504 having a selection interface 506. The selection interface 506 can, for example, be a checkbox (as shown in FIG. 5), a pop-up menu, a virtual button, or other mechanism for indicating that the sub-message 326, 328, 330 is selected. By way of further example, the cheekbox 506 can be selected indicating that the respective sub-message 326, 328, 330 is not to be communicated to the desired recipients. For example, the checkbox 506 for the second message 328 is selected with an X 508 indicating that the second message 328 is not to be communicated to the desired or listed recipients.

As each sub-message 326, 330 is delineated the remove message field 504 is inserted into the interface 500 in association with the respective sub-message 326, 330. Alternatively, as the remove message field 504 is inserted into the interface 500 in association with the respective sub-message 326, 330 after all of the sub-messages 326, 330 are delineated. For example, the email application may store in memory the location of the beginning or ending of each sub-message 326, 330.

Alternatively, the selectable message interface 500 may only display certain, portions of the header 324 or body 322 of each sub-message 326, 328, 330. For example, the selectable message interface 500 may only display the subject field 314 the "from" field 308 and the "sent" field 316. Interface 500 may be shown in a pop-up dialog or pop-up window, for example.

Figure 6:
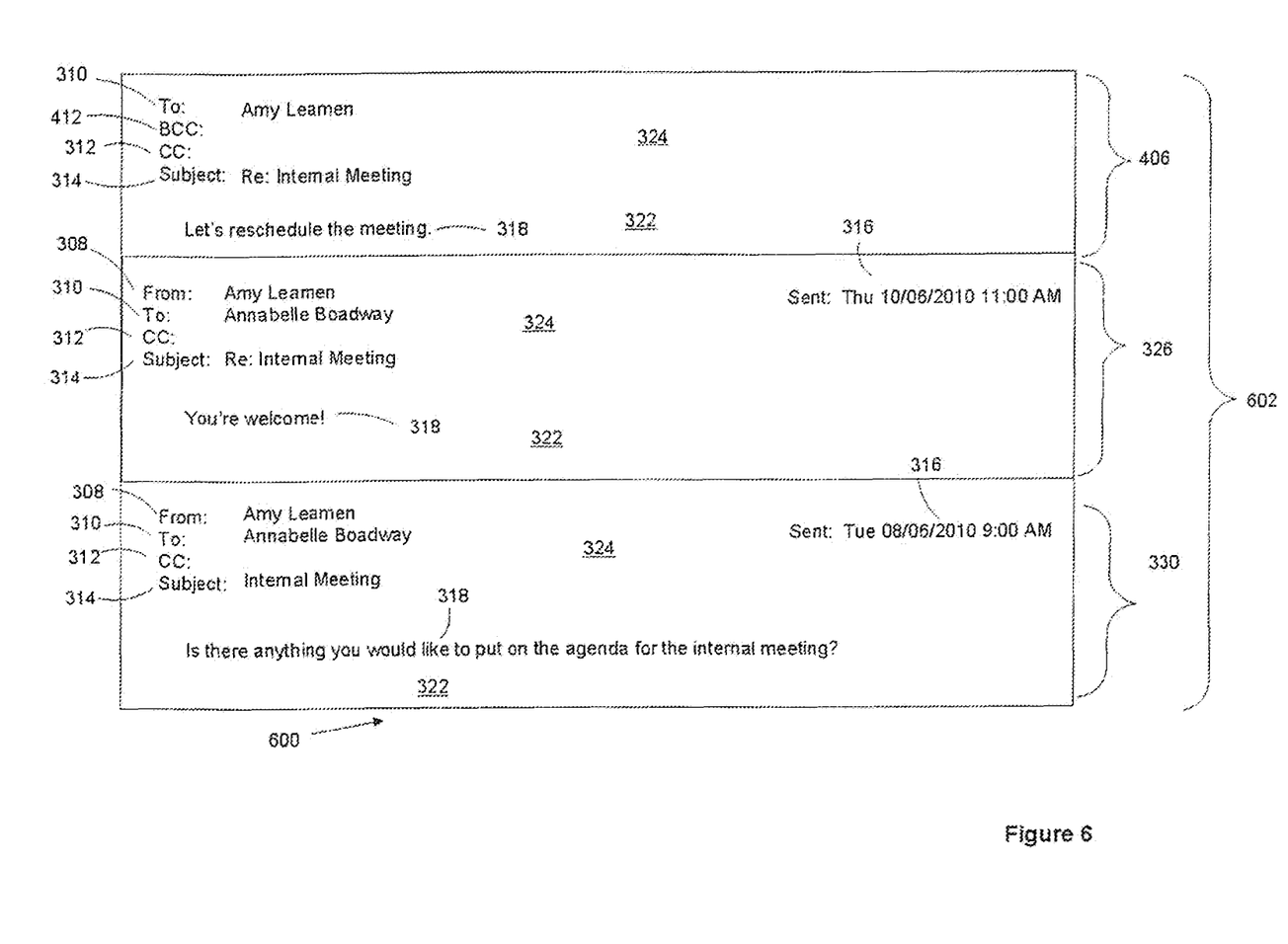
FIG. 6 is a schematic diagram showing a modified message thread.

FIG. 6 shows a modified message thread 602. When the send button 408 is selected the modified message thread 602 is created for communicating to the listed recipients. The modified message thread 602 comprises only the sub-messages 326, 330 that are selected to be sent to the desired recipients. For example, the sub-messages 326, 330 used to compose the modified thread are those sub-messages for which the selection inter-face 506 (e.g. the checkbox) for the remove message field 504 was not selected (e.g. the first message 330 and the third message 326, according to FIGS. 5 and 6). The modified message thread 602 is composed so that the sequence of sub-messages 326, 330 remains similar to that of the initial thread 320. For example, the first message 330 will appear below the third message 326 in the modified message thread 602 that results from the selection interface 506 selection of FIG. 5. The modified message thread 602 is a temporary file stored at the device 102, for example, and its creation does not result in the deletion of the initial message thread 320 from the user's inbox. The initial message thread 320 remains in the user's inbox.

Alternatively, when a selection interface 506 (e.g. the checkbox) is not selected for a particular sub-message then that sub-message is not sent to the desired recipients. There may also be a default option such that the selection interface 506 for the most recent sub-message (e.g. the third message 326 in FIG. 5) is selected, indicating that the default setting is to send the most recent sub-message 326 only.

If there were any attachments in the previous messages 326, 328, 330, they are not included in the modified thread 602.

According to an embodiment, the modified message thread 602 comprises fewer existing sub-messages 326, 328, 330 than in the message thread 320.

Separate modified message threads 602 can be created for each recipient.

For example, when a user selects the "reply with selectable thread" button 334, specific selectable message interfaces 500 open up for each recipient listed in the "to" field 310, the "cc" field 312 and the "bcc" field 412. The selectable message interlaces 500 for each recipient open up sequentially. For example, when the "reply with selectable thread" button 334 is selected, a reply email interface 500 opens up for the first listed recipient in the "to" field 310. The user can then select which existing sub-messages 326, 328, 330 to include in the modified message thread 602 that will be sent to that first listed recipient. After then send button 408 is selected, a second selectable message interface 500 opens up for the second listed recipient in the "to" field 310. The user can similarly select which existing sub-messages 326, 328, 330 to include in the modified message thread 602 for the second listed user. After the send button 408 is selected for the selectable message interface 500 of the last listed recipient, all the modified threads are communicated to the respective recipients. In this way each recipient receives a specific modified message thread 602, which can be different from the modified message thread 602 that other recipients receive.

Alternatively, the selectable message interfaces 500 for each recipient open up simultaneously. The user similarly selects the send button 408 to create and send the modified message thread 602. After each of the send buttons 408 is selected for each selectable message interface 500, all of the modified threads are communicated to the respective desired recipients. Further, after each send button 408 is selected, the respective reply selectable message interface 500 closes and is removed from the display screen. The modified message thread 602 can, for example be stored in a cache memory awaiting for instructions to be communicated to the respective recipient over the network.

Alternatively, one selectable message interface 500 is used for all recipients. The selectable message interface 500 includes a checklist (not shown) of recipients for each existing sub-message 326, 328, 330 in the message thread 320. The checklist of recipients allows a user to select which recipients are to receive which existing sub-messages 326, 328, 330. When the send button 408 is selected, a modified message thread 602 is created for each recipient. The modified message thread 602 for a particular recipient consists of the existing sub-messages 326, 328, 330 that that respective recipient was selected to receive.

The interface used to compose the new message 406 can be different from the interface used to select the existing sub-messages 326, 328, 330 to include in the modified message thread 602.

For example, there may be no remove message fields 504 and instead, when the send button 408 is selected, a prompt appears requesting the user to select which sub-messages 326, 328, 330 are to be communicated to each recipient. For example, the prompt will appear for each desired recipient sequentially. For each prompt (i.e. each recipient), a modified message thread 602 is created using the existing sub-messages 326, 328, 330 selected for the respective recipient.

Alternatively, the selection of the existing sub-messages 326, 328, 330 that are to be communicated to each recipient in modified message threads 602 can be made in an interface prior to composing the new message 406.

Additionally or alternatively, there is a "forward with selectable thread" button (not shown) on the email message interface 300. When the "forward with selectable thread" button is selected a forward-message interface opens up. The forward-message interface window is similar to the selectable message interface 500 and is used for creating a modified message thread 602 to forward to selected recipients (rather than a modified message thread 602 created for replying to selected recipients).

If there were any attachments in the initial message thread 320 (i.e. in the sub-messages 326, 328, 330) those attachments will also be in the modified message thread 602 when the modified message thread(s) 602 is created for forwarding, rather than replying, to desired recipients (e.g. using the "forward with selectable thread" button). However, when replying to a message thread 320 (rather than forwarding the message thread 320), the resulting modified message thread 602, any attachments in the initial message thread 320 will not be included in the modified message thread 602.

Alternatively, if the message thread 320 includes one or more attachments, any number of those attachments can be included in the modified message thread 602 using a similar selection mechanism as that for the sub-messages 326, 328, 330. For example, there may be an attachment selection interface (not shown) listing the attachments in the message thread 320 and including a checkbox or selectable button next to or associated with each attachment. A user can the select which attachments to include in (or exclude from) the modified message thread 602. The attachment selection interface can comprise a prompt, for example, that appears after the send button 408 is selected. Alternatively, the attachment selection interface can comprise a prompt that appears after one of the "forward with selectable thread" button or "reply with selectable thread" button 334 is selected.

Automatic Message Selection

The selection of existing sub-messages 326, 328, 330 to include in the modified message thread 602 can be performed automatically. For example, the automatic selection of existing sub-messages 326, 328, 330 is carried out using rules administered and enforced by an enterprise policy or through an application operating locally on the device 102.

For example, an application running on the device 102 takes as input or scans the text or entries in the "subject" field 314 of each existing sub-message 326, 328, 330. The application also maintains in storage on the device 102 or on a server 108 a list of restricted words or phrases, such as "internal meeting," "privileged and confidential," internal review only," "internal memo," "do not forward externally,"

or the like. If the text of the "subject" field 314 of an existing sub-message 326, 328, 330 is the same as or is similar to one or more of the restricted words or phrases, the application will restrict that sub-message from being communicated to a non-enterprise domain. For example, if the "subject" field 314 of a sub-message 326, 328, 330 contains the text "privileged and confidential," then that sub-message would not form part of the modified message thread 602 that is communicated to non-enterprise domains (e.g. non-work email addresses).

Alternatively, a policy (or IT policy) administered at an enterprise server maintains rules for automatically restricting sub-messages 326, 328, 330 from being sent to non-domain addresses. The policy is created and maintained at the server and is pushed down to each individual device in the corporation for enforcement. The policy also administers the list of restricted words or phrases. The policy may scan the recipient (e.g. by analyzing the email domain) and prompt the user with an indication that an internal message is being forwarded externally. The policy may then block the email from being forwarded externally. Alternatively, the policy may instruct the email application to restrict specific message threads 320 or sub-messages 326, 328, 330 from being selected for inclusion in a modified message thread 620.

Further, the device 102 or the enterprise server can also maintain a list of friendly domains. If the text of the "subject" field 314 an existing sub-message 326, 328, 330 is found in the list of restricted words or phrases, then addresses having a domain that is in the list of friendly domains will still receive that sub-message in their modified message thread 602, even if the domain is a non-enterprise or non-work domain.

Similar rules and policies can be used with respect to different portions of the message thread 320. For example, the message body 322 or other fields in the message header 324 can be analyzed to determine whether any of the existing sub-messages 326, 328, 330 include sensitive or restricted information.

Sensitivity settings can be associated with messages, including, but not limited to email messages. A user can set a sensitivity setting to a specific value when composing an email message. Sensitivity settings can be set to values such as, for example, "confidential," "personal" or "private," A message having a set sensitivity value will indicate the set sensitivity value by, for example, a visible flag or another visible indication. The indication can be in the header 324 for example.

Similarly, email messages can be associated with certain importance levels including, but not limited to "low importance," and "high importance." These importance levels can be set when composing the email message or they can be set by a message recipient after receipt of the message.

Rules and policies can also be applied to the sensitivity settings or importance levels of each existing sub-message 326, 328, 330. For example, there may be an IT policy dictating that any sub-message having a sensitivity setting of "confidential" is not allowed to be included in a modified message thread 602 that is sent to a non-enterprise or non-work domain. By way of further example, users may create and modify lists of approved domains to which sub-messages having a sensitivity setting of "personal" can be sent.

Further, a prompt can appear on the device 102 advising the user that certain domains included in the list of desired recipients will not receive certain automatically removed sub-messaged 328. The prompt may also have an override button or override option which, when selected, overrides any automatic removal of a sub-messages 328 (i.e. so that the automatically removed sub-message 328 will be added back into the modified message thread 602).

Alternatively, if a user attempts to communicated a modified message thread 602 to a domain (e.g. a non-work email address) that is not entitled to receive one of the included sub-messages 326, 330, the device 102 will prompt the user to confirm whether to proceed with the communication. A user can thereby override the rules set by the enterprise policy.

Alternatively, when the modified message thread 602 is created, existing sub-messages 326, 328, 330 from the initial thread 320 that are not included in the modified message thread 602 are grayed-out or blacked-out so that they are not visible. For example, one of or both of the message body 322 and message header 324 of a removed sub-message 328 are replaced with a removal indication (such as a symbol or icon, text such as "Message Text Omitted", or an opaque colour image) so that a person receiving the modified message thread 602 is aware of the existence of a removed sub-message 328 but cannot read at least certain portions of the removed sub-message 328.

Operation

Figure 7:
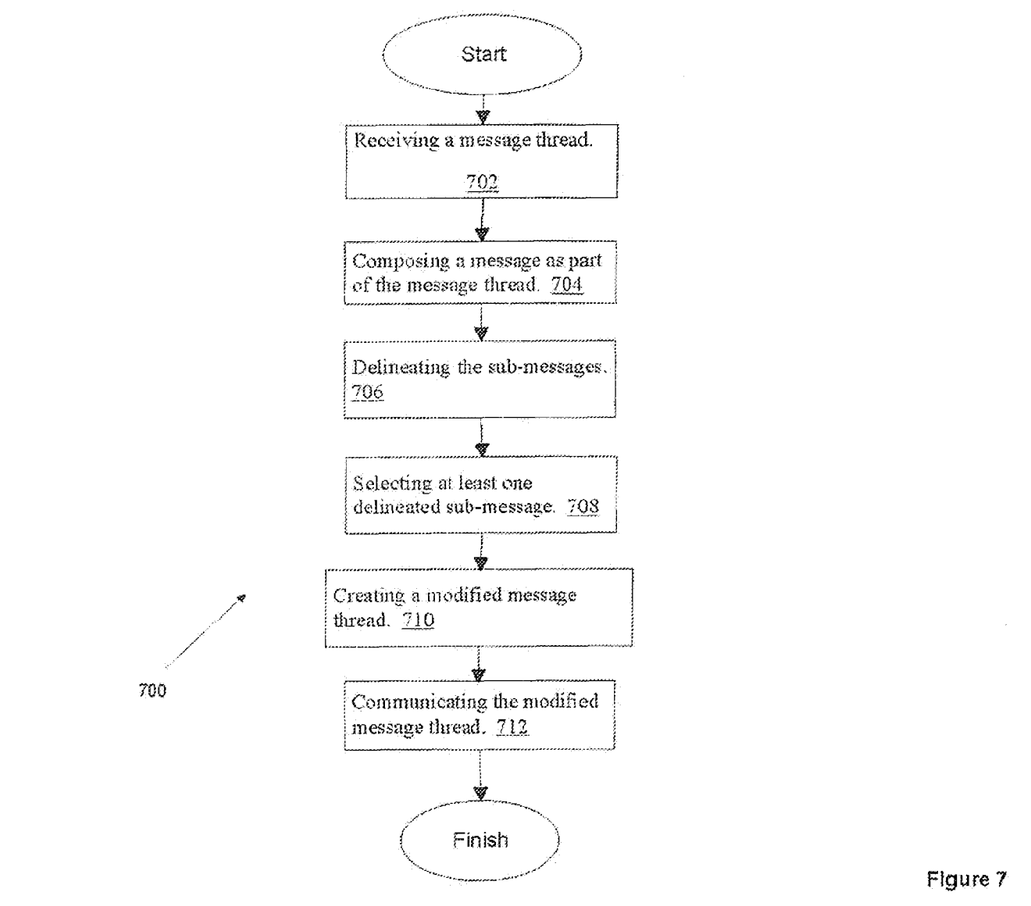
FIG. 7 is a flowchart depicting a method of sending an email.

FIG. 7 is a flow chart depicting the method of communicating a message over a network 106.

At step 702, a message thread 320 is received at the first device 102. The message thread 320 has at least one existing sub-message (e.g. 328, 326, 330). For example, the first device 102 can receive the message thread 320 in the form of an email message communicated over the network 106. It is recognized that the message thread 320 can have more than one existing sub-message 326, 328, 330. The message thread can also include one or more attachments.

At step 704, a second message 406 is composed in response to receiving the message thread 320. The second message 406 can, for example be text, a link or other data and can also include one or more attachments. The second message 406 can be a reply to from the user of the first device 102 to at least the sender of the message thread 320. The response can, alternatively be a forwarding of the message thread 320. Forwarding the message thread 320 can comprise, for example, communicating the message thread 320 along with any attachments to at least one third party.

At step 706, the existing sub-messages 326, 328, 330 are delineated within the message thread 320. For example, the existing sub-messages 326, 328, 330 can be automatically delineated within the message thread 320. According to an embodiment, a received message is selected from the inbox of an email application and is thereby opened up in a new window. The received message comprises a message thread 320. The "reply with selectable thread" button 334 is selected opening up the selectable message interface 500. The email application may then parse the entire message thread 320 in order to delineate each sub-message. For example, the message thread 320 may be parsed to determine the location of each header 324.

Alternatively, existing sub-messages 326, 328, 330 may be encoded using a markup language or structured definition language (e.g. html, xml). Each sub-message may be delineated with tags (e.g. <email> and </email>) or attributes of tags (e.g. <div class="message">). In such a situation the email application can determine the location of the beginning and end of each existing sub-message 326, 328, 330 by parsing the message thread 320. The application can thereby delineate each existing sub-message 326, 328, 330 by, for example, storing in memory the location of the beginning and ending of each existing sub-message 326, 328, 330.

The email application inserts a selection button in each existing sub-message 326, 328, 330 either during the delineation process or after the delineation process is completed. The selection button may also be programmed into the message thread 320 using a markup language. The selection button allows a user to select whether to include each existing sub-message 326, 328, 330 in the modified message thread.

At step 708, at least one of the delineated existing sub-messages 326, 328, 330 is selected from the message thread 320 to include in a modified message thread 602. The at least one existing sub-message 326, 328, 330 can be selected using the selectable message interface 500 with the remove message 504 selection interface 506, for example.

At step 710, the modified message thread 602 is created or built after the existing sub-messages 326, 328, 330 are selected from the message thread 320. For example, modified message thread 602 can be automatically created or built after the existing sub-messages 326, 328, 330 are selected from the message thread 320. After the existing sub-messages 326, 328, 330 are selected from the message thread 320, the modified message thread 602 is built. The modified message thread 602 includes each of the selected existing sub-messages 326, 328, 330 along with the second message 406 in sequential order, for example.

At step 712, the modified message thread 602 is communicated to a second device 102. The second device 102 can be associated with the desired recipient (e.g. the party listed in the "to" field 310 of the email message 406). In an embodiment, when a user selects the send button 408 a confirmation prompt is displayed on the interface of the user's device 102 prompting for confirmation to send the modified message thread 602. For example, there can be a button on the confirmation prompt that, when selected, instructs the device 102 to communicate the modified message thread 602 over the network 106.

In another embodiment of the present application, multiple message threads 320 can be merged into a single modified message thread 602. For example, a user can decide to respond to both a first message thread that has four sub-messages and a second message thread that has live sub messages. These two message threads would be listed in a message list in the user's email inbox interface. The user could select the "Reply with selectable thread" button 334 from the first message thread and could then select the "Reply with selectable thread" button 334 from the second message thread. The user may then be prompted as to whether to combine the two message threads into a single modified message thread 602. If the user agrees to combining the two message threads, then the two message threads may be combined into a single message thread with nine existing sub-messages (four from the first message thread and five from the second message thread) in a selectable message interface 500. The user can then select which sub-messages to include in or exclude from the modified message thread 602, as described above.

The combination of message threads may be a sequential combination in which the second message thread is concatenated onto the first message thread, for example. Alternatively, the sub-messages in the first message thread may be combined with the sub-messages in the second message thread in chronological order to form a single message thread in a selectable message interface 500 from which the user can select which sub-messages to include in a modified message thread 602. By way of further alternative, more than two message threads may be combined into a single message thread in a selectable message interface 500. In this way a user can select sub-messages from multiple message threads to include in a modified message thread 602.

The user may elect not to combine the first and second message threads when prompted to do so. In such a situation, the first message thread may be treated separately from the second message thread. For example, a modified message thread 602 may be created out of the sub-messages from the first message thread, and a second or separate modified message thread 602 may be created from the sub-messages from the second message thread.

In a further embodiment of the present application, the mobile device 102 may be able to identify attachments associated with a message thread 320 that are to be considered sensitive and that should not be forwarded to inappropriate or selected individuals. The determination of which attachments are to be considered sensitive may be carried out using rules administered and enforced by an enterprise policy or through an application operating locally on the device 102. For example, the mobile device 102 may send the attachment(s) to an enterprise server or attachment server to convert it to a readable format and scan it against sensitive word filters to identify whether the attachment(s) has sensitive content. The sensitive word filters may comprise pre-defined rules of what constitutes sensitive content. For example, an attachment may be received in the form of an Adobe® Acrobat memo. The memo may have the phrase "Internal Review Only." This memo may then be scanned or parsed and the phrase "Internal Review Only" would be flagged by the server or application as indicating sensitive content. Thus, when this attachment is attempted to be forwarded or communicated in an email message or modified message thread 602 to an external email address (e.g. Gmail®, Hotmail®, Yahoo™ email, etc.) or to an email address having a non-enterprise domain, the user will be prompted with an indication that the attachment(s) will not be included in the email message or in the modified message thread 602. The prompt may further provide the user with an opportunity to override the decision and thus include the attachment(s) in the email message or in the modified message thread 602.

One or more currently preferred embodiments have been described by way of example. It will be apparent to persons skilled in the art that a number of variations and modifications can be made without departing from the scope of what is defined in the claims.

What is claimed is the following:

1. A communication device comprising a processor and memory coupled thereto and a communication sub-system coupled to the processor for communicating over a network a message thread, the memory storing instructions and data for execution by the processor to configure the communication device to:
   a. provide a selection interface to:
      present a plurality of sub-messages in the message thread, at least, one of the sub-messages in the message thread having been communicated between at least two other communication devices and each sub-message having a respective message body and a message header including at least one message recipient field;
      parse text of the message thread to locate the at least one message recipient field in each of the plurality of sub-messages;
      in response to the parsing generate a plurality of delineated sub-messages corresponding to each sub-message by using, for each of the sub-messages in the plurality of sub-messages, the located recipient message field to delineate the header containing the located message recipient field as a beginning of that sub-message, each delineated sub-message containing the respective message body and the message header of the corresponding sub-message;

display the plurality of delineated sub-messages in the selection interface to facilitate user input to select individual sub-messages in the message thread;

b. in response to receiving the user input generate one or more modified message threads for communicating to respective ones of a plurality of recipients, the modified message threads including or excluding one or more of the selected sub-messages; and c. initiate communication of the respective ones of the plurality of modified messages threads to the respective ones of the plurality of recipients.

2. The communication device of claim 1 wherein the selection interface is further configured to present only a portion of each of the plurality of sub-messages.

3. The communication device of claim 1 wherein the instructions and data configure the communication device to receive the message thread at the communication device.

4. The communication device of claim 3 wherein the instructions and data configure the communication device to receive input to compose the respective ones of the plurality of modified message threads.

5. The communication device of claim 1 wherein the instructions and data configure the communication device to replace ones of the sub-messages excluded from any of the respective ones of the plurality of modified messages threads with a removal indication.

6. The communication device of claim 1 wherein the message thread comprises an attachment and wherein the instructions and data configure the communication device to further provide an attachment selection interface for optionally selecting the attachment for inclusion with any of the respective ones of the plurality of modified messages threads.

7. A method of communicating a message thread, the method comprising:

a. providing a selection interface at a communication device for:

presenting a plurality of sub-messages in the message thread, at least one of the sub-messages in the message thread having been communicated between at least two other communication devices and each sub-message having a respective message body and a message header including at least one message recipient field;

parsing text of the message thread to locate the at least one message recipient field in each of the plurality of sub-messages;

in response to the parsing generating a plurality of delineated sub-messages corresponding to each sub-message by using, for each of the sub-messages in the plurality of sub-messages, the located recipient message field to delineate the header containing the located recipient message field as a beginning of that sub-message, each delineated sub-message containing the respective message body and the message header of the corresponding sub-message;

displaying the plurality of delineated sub-messages in the selection interface to facilitate user input to select individual sub-messages in the message thread;

b. in response to receiving the user input generating one or more modified message threads for communicating to respective ones of a plurality of recipients, the modified message threads including or excluding one or more of the selected sub-messages; and c. initiating communication of the respective ones of the plurality of modified messages threads to the respective ones of the plurality of recipients.

8. The method of claim 7 wherein the selection interface is configured to present only a portion of each of the plurality of sub-messages.

9. The method of claim 7 comprising receiving the message thread at the communication device.

10. The method of claim 9 comprising receiving input to compose the respective ones of the plurality of modified message threads for communicating to the respective ones of the plurality of recipients.

11. The method of claim 7 comprising replacing ones of the sub-messages excluded from any of the respective ones of the plurality of modified messages threads with a removal indication.

12. The method of claim 7 wherein the message thread comprises an attachment, the method further comprising providing an attachment selection interface for optionally selecting the attachment for inclusion with any of the respective ones of the plurality of modified messages threads.

13. A non-transitory computer readable medium having instructions and data embodied therein for execution by a processor of a communication device to communicate over a network a message thread, the instructions and data configuring the communication device to;

a. provide a selection interface to:

present a plurality of sub-messages in the message thread, at least one of the sub-messages in the message thread having been communicated between at least two other communication devices and each sub-message having a respective message body and a message header including at least one message recipient field;

parse text of the message thread to locate the at least one message recipient field in each of the plurality of sub-messages;

in response to the parsing generate a plurality of delineated sub-messages corresponding to each sub-message by using, for each of the sub-messages in the plurality of sub-messages, the located recipient message field to delineate the header containing the located message recipient field as a beginning of that sub-message, each delineated sub-message containing the respective message body and the message header of the corresponding sub-message;

display the plurality of delineated sub-messages in the selection interface to facilitate user input to select individual sub-messages in the message thread;

b. in response to receiving the user input generate one or more modified message threads for communicating to respective ones of a plurality of recipients, the modified message threads including or excluding one or more of the selected sub-messages; and c. initiate communication of the respective ones of the plurality of modified messages threads to the respective ones of the plurality of recipients.

14. The non-transitory computer readable medium of claim 13 wherein the selection interlace is configured to present only a portion of each of the plurality of sub-messages.

15. The non-transitory computer readable medium of claim 13 wherein the instructions and data configure the communication device to receive the message thread at the communication device.

16. The non-transitory computer readable medium of claim 15 wherein the instructions and data configure the communication device to receive input to compose the respective ones of the plurality of modified message threads for communicating to the respective ones of the plurality of recipients.

17. The non-transitory computer readable medium of claim 13 wherein the message thread comprises an attachment and wherein the instructions and data configure the communication device to further provide an attachment selection interface for optionally selecting the attachment for inclusion with any of the respective ones of the plurality of modified messages threads.

* * * * *

UNITED STATES PATENT AND TRADEMARK OFFICE
CERTIFICATE OF CORRECTION

PATENT NO.         : 9,628,421 B2  
APPLICATION NO.    : 13/912677  
DATED              : April 18, 2017  
INVENTOR(S)        : Thanh Vinh Vuong It is certified that error appears in the above-identified patent and that said Letters Patent is hereby corrected as shown below:

In the Claims

• In Claim 1, Column 13, Line 18, the word "messages" should read "message";

• In Claim 7, Column 14, Line 1, there is a "," missing between the words "input" and "generating";

• In Claim 14, Column 14, Line 65, the word "interlace" should read "interface".

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*